United States Patent Office 3,484,432
Patented Dec. 16, 1969

3,484,432
WATER-SOLUBLE, REACTIVE 1:2-COBALT AZO DYESTUFFS CONTAINING HALOGENO OR SULPHO-s-TRIAZINE GROUPS
Ian Knowles Barben and Dennis Eckersley, Manchester, England, assignors to Imperial Chemical Industries Limited, London, England, a corporation of Great Britain
No Drawing. Filed July 18, 1966, Ser. No. 565,708
Claims priority, application Great Britain, July 23, 1965, 31,477/65
Int. Cl. C09b 45/20, 45/16
U.S. Cl. 260—146                    3 Claims

ABSTRACT OF THE DISCLOSURE

Water soluble 1:2-chromium and 1:2-cobalt azo dyestuffs containing halogeno- or sulpho-s-triazine reactive groups. The dyestuffs color fibers containing hydroxyl groups especially cellulose materials which are characterized by high fiber fixation with good fastness to wet processing.

This invention relates to new water-soluble reactive azo dyestuffs, to the methods of preparation thereof and to the use of such dyestuffs for colouring textile materials.

It is known to use dyestuffs containing halogeno- or sulpho-s-triazine groups for the purpose of colouring fibres containing hydroxyl groups, especially cellulose materials such as cotton and viscose rayon.

These dyestuffs readily fix on such material with good fastness to wet processing, since the halogeno- or sulpho-s-triazine group is able to react with hydroxyl groups of the cellulose molecule in the presence of acid-binding agents, especially at elevated temperatures. For this purpose, the dyestuffs are applied from aqueous solutions or aqueous printing pastes and, owing to a side-reaction in which the halogen atom or sulpho group reacts with water instead of the cellulose molecule, a considerable portion of the dyestuff does not fix on the fibre.

Consequently an excess of dyestuff must be used and the dyeings or prints must be thoroughly washed with boiling soap solutions to remove the unreacted dyestuff. The wastage of dyestuff and extra processing make the dyeing or printing process more expensive, especially when deep shades are required.

The present invention is concerned with the production of water-soluble halogeno- or sulpho-s-triazine reactive dyestuffs which have a remarkably high fixation on the fibre and for which washing-off treatments can be reduced considerably.

According to the invention, there are provided water-soluble 1:2-chromium and 1:2-cobalt azo dyestuffs of the formula:

$$M(F-N-C \diagup^N\diagdown C-N-C_6H_4O-Y)_2 \atop \underset{R_1}{|} \underset{N}{|} \underset{\diagdown\diagup}{\|} \underset{R_2}{|} \atop \underset{C}{\phantom{|}} \atop \underset{X}{|}$$ (1)

wherein M stands for Co or Cr, F represents the radical of a metallisable azo compound, $R_1$ and $R_2$ each independently represents a hydrogen atom or an alkyl group of 1 to 4 carbon atoms; X represents Cl, or $SO_3H$; Y represents a $-CH_2.CHOH.CH_2Cl$, $-CH_2.CHOHCH_2Br$, or $-CH_2.CHOH.CH_2OSO_3H$ group.

It is preferred, in general, that both $R_1$ and $R_2$ represent hydrogen atoms.

The $NR_1$ group of Formula 1 is connected to the remainder of the molecule through a carbon atom of the azo compound radical. This carbon atom may, for example, form part of an aliphatic chain, but is preferably a nuclear carbon atom forming part of an aromatic ring structure such as a benzene or a naphthalene nucleus.

The metallisable monoazo compound represented by F in the above formula is preferably an o-(o'-hydroxyphenylazo)naphthol, o-(o'-carboxyphenylazo)naphthol, o,o'-dihydroxyazonaphthalene, o-hydroxynaphthylazopyrazolone or o-hydroxyphenylazopyrazolone compound. Above all are preferred those dyestuffs in which F—NR₁— stands for a radical of formula:

$$(HO_3S)_m \diagdown \diagup^{O-} \diagup^{-N=N-} \diagdown^{-O}\diagup \diagup^{NH-} \diagdown_{NO_2} \diagup_{HO_3S} \diagdown_{SO_3H}$$ (2)

wherein $m$ is 0 or 1.

The new dyestuffs can be obtained by reacting together a 1:2-metal complex azo compound of the formula:

$$M(F-N-C\diagup^N\diagdown C-X)_2 \atop \underset{R_1}{|} \underset{N}{\diagdown\diagup} \atop \underset{C}{\phantom{|}} \atop \underset{X}{|}$$ (3)

wherein M, F, $R_1$ and X have the meanings stated above, with an amine of the formula: $NHR_2C_6H_4O-Y$, wherein $R_2$ and Y have the meanings stated above.

The above process is preferably carried out in aqueous medium by condensing one mole of the azo compound with one mole of the amine. For this purpose, the azo compound is dissolved or suspended in water or a mixture thereof with a water-miscible organic solvent such as acetone, and reacted with one mole of the amine. The reaction normally takes place conveniently in the range 20 to 50° C. and is preferably effected in the presence of an acid-binding agent to neutralise acid liberated during the reaction. The dyestuffs so obtained can be isolated by the usual techniques for example by being salted out from the reaction mixture or by spray drying.

As examples of amines of the above formula there may be mentioned: 4-(γ-chloro-β-hydroxypropoxy)aniline, and 4-(γ-sulphato-β-hydroxypropoxy)aniline.

The azo compounds of Formula 3 can be obtained by a number of methods, for example:

Where X represents Cl (a) condensing a 1:2-chromium or 1:2-cobalt-complex of a metallisable azo compound having a group —NHR₁ with cyanuric chloride; (b) it is sometimes possible to metallise a metallisable amino azo compound already containing a dichloro-s-triazine group. In many cases, however, the reaction conditions necessary to carry out metallisation lead to loss, by hydrolysis, of one or more of the chlorine substituents represented by X; where X represents a sulpho group, (c) these can be obtained by treating the corresponding compounds in which X represents chlorine atoms, obtained by either of methods (a) and (b) above, with an alkali metal salts of sulphurous acid.

The new dyestuffs can also be obtained by reacting a compound or mixture of compounds of the formula:

$$X-C\diagup^N\diagdown C-N.C_6H_4OY \atop \underset{N}{|} \underset{\diagdown\diagup}{\|} \underset{R_2}{|} \atop \underset{C}{\phantom{|}} \atop \underset{X}{|}$$ (4)

with an azo compound containing an acylatable amino group of formula —NHR₁.

The compound, or mixture of compounds, of Formula 4 can be obtained by reaction of cyanuric chloride with an amine of the formula NHR₂.C₆H₄—O—Y, the symbols R₂ and Y having the meanings stated above, and, if necessary, subsequently reacting with an alkali metal salt of sulphurous acid.

The metal-complex azo compounds used as starting materials can be prepared by known methods, for example by metallisation of metallisable azo compounds which contain, in addition to the groups capable of forming the metal complex, an acylatable amino group, that is to say, a primary or secondary amino group linked to an aromatic nucleus of the molecule directly or through a bridging group, e.g. an alkylene radical or a $SO_2$ group. Suitable metallisable monoazo compounds can be made for example, by coupling an orthohydroxy or ortho-carboxy-diazo compounds of the benzene or naphthalene series, more especially a diazotised ortho-amino-phenol such as a chloro- or nitro-ortho-aminophenol, an ortho-aminophenol-mono- or disulfonic acid or ortho-amino-benzoic acid or a sulfonic acid thereof, with a coupling component that is capable of coupling in vicinal position to a hydroxyl group (or to an enolizable keto group respectively) and contains another such acylatable hydroxyl or amino group or a substituent convertible into such a group. As examples of such coupling components may be mentioned Resorcinol and dihydroxynaphthalenes, m-aminophenol, 1-aryl-5-pyrazolones containing in the aryl radical an amino group or a substituent convertible into such a group optionally after maufacture of the dyestuff or after its metallisation, such as 1-(2'-, 3'- or 4'-amino-phenyl)-3-methyl-5-pyrazolone, 1-(3'- or 4'-aminophenyl)-5-pyrazolone-3-carboxylic acid, furthermore β-keto-carboxylic acid arylamides whose arylide radical contains acylatable amino or hydroxyl groups, and aminonaphthol sulphonic acids such as 2-amino-8-hydroxy-naphthalene-6-sulfonic acid, 2-N-methylamino-8-hydroxynaphthalene-6-sulfonic acid, 2-alkylamino-5-hydroxynaphthalene-7-sulfonic acid, 2 - amino - 5 - hydroxy - naphthalene - 1 - sulfonic acid, 2-(3'- or 4'-aminobenzoylamino)-5-hydroxy-naphthalene-7-sulfonic acid, 2-(4'-acetylaminophenylami-no)-5-hydroxynaphthalene-7-sulfonic acid or 2-(4'-amino-phenylamino)-5-hydroxynaphthalene-3':7-disulfonic acid. In selecting the diazo and coupling components it must be ensured that the resultant compound contains at least one water-solubilising group. Useful metallisable compounds are obtained also by reducing o, o'-dihydroxy azo dyestuffs containing nitro groups, or by hydrolysing metal-lisable azo compounds containing acylamino groups, e.g. by splitting the acyl group of compounds obtainable from o-hydroxydiazo or o-carboxydiazo compounds of the benzene series that contain acylamino groups and the afore-mentioned coupling components. The hydrolysis can be performed, if desired, during or after metallisation of the compounds.

The conversion of the compounds obtained from the aforesaid components into the complex metal compounds to be used as starting materials in the process of the invention can be performed with compounds or mixtures thereof such as are present in the coupling mixture.

Suitable metal-yielding agents are, for example, inorganic acid salts of cobalt and chromium.

The metal compounds thus obtained contain one atom of metal for every one or two molecules of azo dyestuff molecules.

Suitable metal-yielding agents are, for example, salts that contain the aforementioned metals as the cation such, for example, as chromium sulfates, cobalt acetate or cobalt sulfate. In some cases it is of advantage to use a complex metal compound in which one of the aforementioned metal is bound in complex union in the anion, e.g. complex chromium compounds of organic hydroxycarboxylic acids, such as salicylic acid or complex cobalt compounds of the alkali metal salts of aliphatic aminocarboxylic acids or hydroxycarboxylic acids such as glycine, lactic acid and all tartaric acid.

The treatment with the metal-yielding agent can be performed by a known method, e.g. by heating at a temperature ranging from 50 to 120° in an open vessel, e.g. while refluxing or optionally in a closed vessel.

The new dyestuffs can be used for dyeing or printing a wide variety of textile materials. They are particularly valuable for use as reactive dyes for cellulose textile materials with which they are capable, in the presence of acid-binding agents, of reacting with a high degree of efficiency.

The invention is illustrated but not limited by the following examples in which parts and percentages are by weight:—

EXAMPLE 1

A neutral suspension of 1-amino-7-(2'-hydroxy-5'-nitro-phenylazo)-8-naphthol-3:6-disulphonic acid (48.46 parts) in 600 parts of water is stirred at 98–100° C. and a solution of 13.3 parts of chromic chloride hexahydrate in 150 cc. of water is added. The mixture is stirred at the boil, the pH of the solution being adjusted to 5 by the addition of 2 N-sodium carbonate at intervals during the reaction, until chroming is complete. The mixture is cooled, neutralised, and added to a stirred suspension of 19 parts of cyanuric chloride in 150 parts of acetone and 300 parts of ice water at 0–5° C. during 30 minutes maintaining a pH of 6–7 by the simultaneous addition of 2 N sodium carbonate. The mixture is stirred at 0–5° C. for a further hour, then excess of cyanuric chloride is screened off. A suspension of 27.6 parts of 4-(3'-chloro-2'-hydroxypropoxy)aniline half sulphate in 50 parts of water is added and the mixture is heated to 40–45° C. After stirring at this temperature for 3–4 hours, maintaining a pH of 6–7 by the addition of 2 N-sodium carbonate, the mixture is filtered and the dyestuff is precipitated by the addition of 200 parts of potassium chloride. The precipitate is filtered off, washed with 15% aqueous potassium chloride solution and dried at 40° C. When applied to cotton in the presence of an acid-binding agent, black shades are obtained of good fastness to washing.

EXAMPLE 2

The process described in Example 1 is repeated, except that after reaction of the cyanuric chloride with the aminoazo compound, 10 parts of sodium sulphite crystals are added and the mixture is stirred at 10–15° C. for 2 hours before the 4-(3'-chloro-2'-propoxy)aniline half sulphate is added. When applied to cotton in the presence of an acid-binding agent, black shades are obtained of good fastness to washing.

EXAMPLE 3

In place of the 13.3 parts of chromic chloride hexahydrate used in Example 1, there are used 12.5 parts of cobalt acetate tetrahydrate whereby the corresponding cobalt complex is obtained. When applied to cotton in the presence of an acid-binding agent, black shades are obtained which have excellent fastness to washing.

EXAMPLE 4

In place of the 48.46 parts of 1-amino-7-(2'-hydroxy-5'-nitrophenylazo)-8-naphthol-3:6-disulphonic acid used in Example 1, there are used 56.45 parts of 1-amino-7-(2'-hydroxy-3'-nitro-5' - sulphophenylazo)-8-naphthol-3:6-disulphonic acid. The resultant dyestuff, when applied to cotton in the presence of an acid-binding agent, gives black shades of good fastness to washing.

EXAMPLE 5

In place of the 48.46 parts of 1-amino-7-(2'-hydroxy-5'-nitrophenylazo) - 8 - naphthol-3:6-disulphonic acid used in Example 1, 56.45 parts of 1-amino-7-(2'-hydroxy-3'-sulpho-5'-nitro-phenylazo)-8-naphthol-3:6 - disulphonic acid are used. The resultant dyestuff, when applied to cotton in the presence of an acid-binding agent, gives black shades of good fastness to washing.

EXAMPLE 6

A neutral suspension of 51.3 parts of 1-(2'-methyl-3'-amino-5'-sulphophenyl)-4-(2"-hydroxy - 5" - sulphophenylazo)-5-pyrazolone-3-carboxylic acid in 300 parts of water is stirred with 11.9 parts of cobalt chloride hexahydrate. The solution is warmed to 60° C. and after a stirring for 10 minutes the pH is adjusted to 7 by the addition of sodium carbonate solution. After stirring for a further 1 hour at 60° C. the pH is adjusted to 8, and the suspension is screened. The pH of the filtrates is then adjusted to 7 by the addition of hydrochloric acid. The resultant solution is then added during 30 minutes at 0–5° C. to a stirred suspension of 18.5 parts of cyanuric chloride in 100 parts of acetone and 400 parts of ice water. The pH is maintained at 6–7 by the simultaneous addition of 2N-sodium carbonate. After stirring for a further 30 minutes at this pH the mixture is screened and a suspension of 25.2 parts of 4-(3'-chloro-2'-hydroxypropoxy)aniline half sulphate in water is added. The temperature is raised to 30° C. and maintained at 30–35° C. for 2 hours and the pH is maintained at 6–7 by the addition of 2 N-sodium carbonate. The dyestuff is isolated by the addition of potassium acetate and filtration. The product is slurried with ethanol and dried at 40° C. When applied to cellulose in the presence of an acid-binding agent orange shades of good wash-fastness are produced.

EXAMPLE 7

If, in place of the 27.6 parts of 4-(3'-chloro-2'-hydroxypropoxy)aniline half sulphate used in Example 1, there are used 20.2 parts of 3-(3'-chloro-2'-hydroxypropoxy)aniline, a dyestuff of similar shade is obtained.

EXAMPLE 8

If, in place of the 27.6 parts of 4-(3'-chloro-2'-hydroxypropoxy)aniline half sulphate used in Example 1, there are used 24.6 parts of 4-(3'-bromo-2'-hydroxypropoxy)aniline, a dyestuff of similar shade is obtained.

EXAMPLE 9

If, in place of the 27.6 parts of 4-(3'-chloro-2'-hydroxypropoxy)aniline half sulphate used in Example 1, there are used 26.3 parts of 4'-3'-sulphato-2'-hydroxypropoxy)aniline, a dyestuff of similar shade is obtained.

EXAMPLE 10

A neutral solution of 26.3 parts of 4-(γ-sulphato-β-hydroxypropoxy)aniline in 1000 cc. of water is added dropwise to a stirred suspension of 19 parts of cyanuric chloride in 200 parts of acetone and 800 parts of ice water at 0.5° C. whilst maintaining pH 6–7 by the addition of 2 N-sodium carbonate solution. When the pH remains steady the screened mixture is added to a neutral solution prepared as described in Example 1, col.—, line— to col.—line—. The mixture is then stirred at 35–40° C. maintaining pH 6–7 by the addition of 2 N-sodium carbonate. When condensation is complete as shown by the attainment of a steady pH, the dyestuff is isolated by the addition of potassium chloride. After stirring until precipitation has occurred the dyestuff is filtered off and dried at 40° C. When applied to cotton in the presence of an acid-binding agent, black shades are obtained of good fastness to washing.

The following table gives further examples of dyes of the invention which are prepared from the diazo and coupling components listed in columns I and II respectively, followed by metallisation to form the metal complex stated in column III. This metal complex is then condenser with cyanuric chloride followed by condensation with 4-(3-chloro-2-hydroxypropoxy)aniline. The shades of the dyestuffs so obtained are listed in column IV.

| I | II | III | IV |
|---|---|---|---|
| 6-nitro-1-amino-2-naphthol-4-sulphonic acid. | 2-amino-5-naphthol-7-sulphonic acid. | Cr | Blue. |
| Do. | do. | Co | Reddish-blue. |
| 1-amino-2-naphthol-4-sulphonic acid. | 1-amino-8-naphthol-3;6-disulphonic acid. | Cr | Do. |
| Do. | do. | Co | Do. |
| Do. | 2-amino-5-naphthol-7-sulphonic acid. | Cr | Dull reddish-blue. |
| Do. | 2-methylamino-5-naphthol-7-sulphonic acid. | Co | Do. |
| 5-aminoanthranilic acid. | 2-(3-sulphophenyl)amino-8-naphthol-6-sulphonic acid. | Cr | Brown. |
| 4-nitro-2-aminophenol. | 1-amino-8-naphthol-4-sulphonic acid. | Cr | Dull blue. |
| Do. | do. | Co | Dull maroon. |
| 6-nitro-2-aminophenol-4-sulphonic acid. | 2-amino-8-naphthol-6-sulphonic acid. | Cr | Dull blue. |
| Do. | do. | Co | Dull brown. |
| 4-chloro-2-aminophenol-6-sulphonic acid. | do. | Cr | Violet. |
| Do. | do. | Co | Purple. |
| 6-nitro-1-amino-2-naphthol-4-sulphonic acid. | 1-(3-amino-4-sulphophenyl)-3-methyl-5-pyrazolone. | Co | Rubine. |
| Do. | do. | Cr | Do. |
| Do. | 1-(3-amino-4-sulphophenyl)-3-carboxypyrazolone. | Co | Do. |
| Do. | do. | Cr | Do. |

We claim:
1. A water-soluble azo dyestuff of the formula:

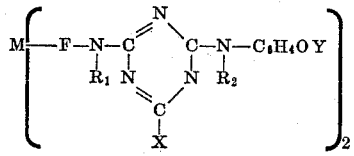

wherein:
M represents Co or Cr,

stands for the radical of formula:

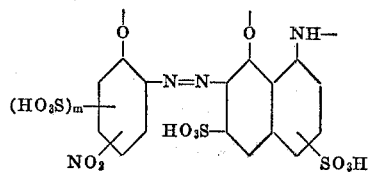

wherein:
M is 0 or 1,
$R_2$ is hydrogen or alkyl of 1 to 4 carbon atoms,
X is Cl or $SO_3H$,
Y is $-CH_2.CHOH.CH_2Cl$, $-CH_2.CHOHCH_2Br$ or $-CH_2.CHOH.CH_2OSO_3H$.

2. A water-soluble azo dystuff as claimed in claim 1 being the 1:2-chromium complex of the azo compound:
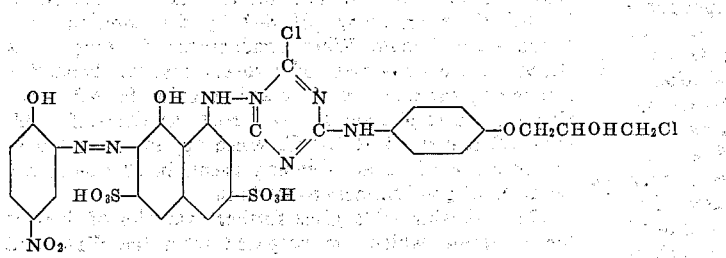
3. A water-soluble azo dyestuff as claimed in claim 1 being the 1:2-cobalt complex of the azo compound:
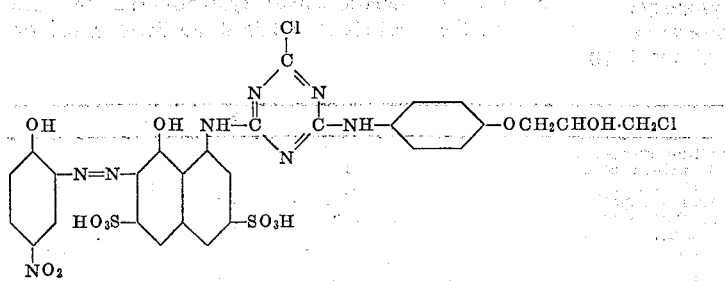
References Cited
UNITED STATES PATENTS
3,162,628   12/1964   Berrie et al. -------- 260—146
3,354,140   11/1967   Benz et al. -------- 260—146
FLOYD D. HIGEL, Primary Examiner
U.S. Cl. X.R.
8—42; 260—147, 249.8, 249.5, 151, 198, 163, 195, 150, 162